(12) United States Patent
Kanzaka

(10) Patent No.: US 7,675,404 B2
(45) Date of Patent: Mar. 9, 2010

(54) INDICATOR FOR VEHICLE

(75) Inventor: Ryuji Kanzaka, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 275 days.

(21) Appl. No.: 11/761,502

(22) Filed: Jun. 12, 2007

(65) Prior Publication Data

US 2008/0007393 A1    Jan. 10, 2008

(30) Foreign Application Priority Data

Jul. 10, 2006    (JP) .............................. 2006-189279

(51) Int. Cl.
*B60Q 1/00* (2006.01)
*B60K 31/18* (2006.01)
*B60K 17/00* (2006.01)

(52) U.S. Cl. ................. 340/441; 340/439; 180/171; 180/338

(58) Field of Classification Search ................. 702/142, 702/145–148; 340/438, 439, 441; 180/170, 180/171, 338
See application file for complete search history.

(56) References Cited

U.S. PATENT DOCUMENTS

| | | | | |
|---|---|---|---|---|
| 3,947,814 A | * | 3/1976 | Allen | .......................... 340/441 |
| 5,020,361 A | * | 6/1991 | Malecki et al. | ........... 73/115.02 |
| 6,625,562 B2 | | 9/2003 | Hayashi et al. | |
| 6,888,448 B2 | * | 5/2005 | Sandberg et al. | ............. 340/441 |
| 7,236,089 B2 | * | 6/2007 | Ono et al. | ..................... 340/461 |
| 7,262,689 B2 | * | 8/2007 | Kolpasky | ..................... 340/461 |

FOREIGN PATENT DOCUMENTS

| | | |
|---|---|---|
| DE | 893 421 B | 10/1953 |
| DE | 1 878 994 U | 9/1963 |
| DE | 101 08 934 A1 | 9/2002 |
| JP | 64-3215 A | 1/1989 |
| JP | 5-248536 A | 9/1993 |
| JP | 6-10030 U | 2/1994 |
| JP | 10-175461 A | 6/1998 |
| JP | 10-339333 A | 12/1998 |
| JP | 2000-240415 A | 9/2000 |

* cited by examiner

*Primary Examiner*—Jennifer Mehmood
(74) *Attorney, Agent, or Firm*—Sughrue Mion, PLLC

(57) ABSTRACT

An indicator for a vehicle having an engine and a transmission, includes a main engine speed indicator for indicating a present engine speed of the engine, and an auxiliary engine speed indicator for indicating an engine speed given after a gear shift operation of the transmission and calculated based upon the present engine speed. According to the indicator, the engine speed given after the shift operation of the transmission can be prospectively recognized. The drivability thus can be enhanced.

8 Claims, 8 Drawing Sheets

INDICATOR FOR VEHICLE

INCORPORATION BY REFERENCE

The disclosure of Japanese Patent Application No. 2006-189279 filed on Jul. 10, 2006, including the specification, drawings and abstract is incorporated herein by reference in its entirety.

BACKGROUND OF THE INVENTION

1. Field of the Invention

This invention relates to an indicator for a vehicle, and particularly relates to a technology for prospectively indicating an engine speed given after an upcoming gear shift operation.

2. Description of the Related Art

A vehicle's indicator such as an engine speed gauge (tachometer) indicates engine speeds of an internal combustion engine for automobiles. A driver thus can drive a car while recognizing an engine speed indicated by the tachometer.

Meanwhile, in a car with a manual transmission (MT car), a shift lever or the like placed adjacent to a driver's seat is operated to make a gear shift operation of a transmission. After the gear shift operation, the engine speed of the car changes in accordance with the gear ratio. If the transmission is shifted to a lower gear, the engine speed increases. On the other hand, if the transmission is shifted to an higher gear, the engine speed decreases. Similarly, in a car that has an automatic transmission (AT car), the engine speed varies with a gear shift operation if the AT car has a manual gear shift mode. Additionally, technologies for preventing over revolution from occurring with the gear shift operation are described in JP-A-Hei 10-339333, JP-A-Hei 5-248536 and JP-A-Hei 10-175461.

Conventional indicators for a vehicle, however, simply indicate the present engine speed. Thus, there is a problem that the driver cannot determine the likely engine speed after a gear shift operation of the transmission (i.e., not recognizable before the gear shift operation).

In addition, an engine has its own engine speed range for good fuel economy and engine speed range in which a high output/high torque operation is provided. Therefore, if the gear shift operation is made under the condition that the engine speed given after the gear shift operation is not prospectively recognized, the engine speed after the gear shift operation may be largely off from the optimum engine speed ranges for fuel economy and for high output/high torque operation contrary to the intent of the driver. As a result, there arises another problem that drivability is adversely affected.

SUMMARY OF THE INVENTION

The present invention provides an improved vehicle indicator whereby the engine speed given after a gear shift operation of a transmission is prospectively recognized to enhance the drivability.

Thus, in accordance with an aspect of this invention, an indicator for a vehicle having an engine and a transmission constructed as follows is provided. That is, the indicator includes a primary engine speed indicator for indicating the present engine speed of the engine, and an auxiliary engine speed indicator for indicating an engine speed given after a gear shift operation of the transmission and calculated based upon the present engine speed.

According to the above aspect, because of the indications by the primary engine speed indicator and the auxiliary engine speed indicator, a driver can recognize not only the present engine speed but also the engine speed after the gear shift operation of the transmission. Also, as discussed above, the engine has its own engine speed range for good fuel economy and engine speed range in which the high output/high torque operation is provided. Because the driver can prospectively recognize the upcoming engine speed given after the gear shift operation, the driver can always take account of such speed ranges while driving the car. The drivability thus can be enhanced. For example, the driver can change gears after recognizing that the engine speed given after the gear shift operation exists in the engine speed range for good fuel economy. The driving with the excellent fuel economy thus may be realized.

As thus discussed, the engine speed given after the gear shift operation can be prospectively recognized, and the drivability can be enhanced.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. An automobile with a manual transmission embodying the indicator for a vehicle (simply called "indicator" below) of this invention will be discussed below.

Figure 1:
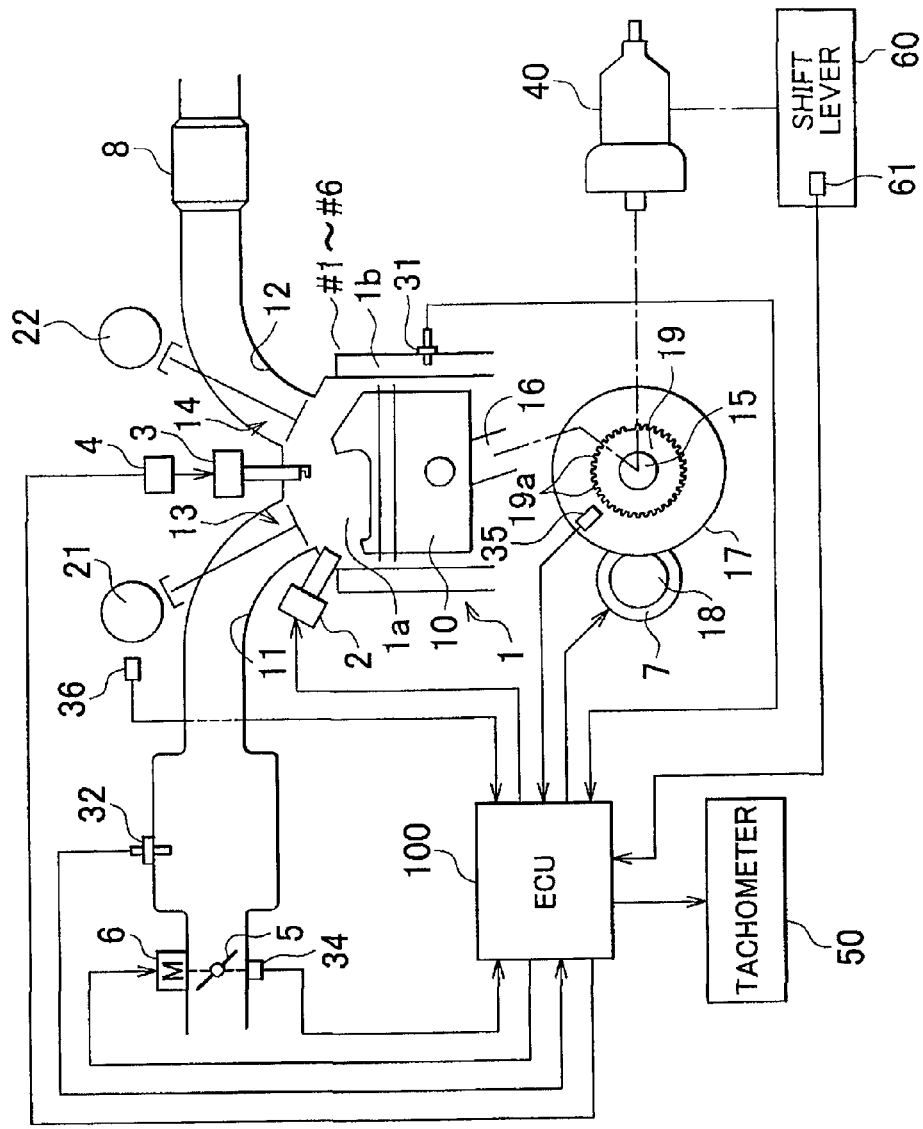
FIG. 1 is a schematic diagram showing an overall structure of a device of a first embodiment embodying the indicator for a vehicle of this invention.
Figure 4:
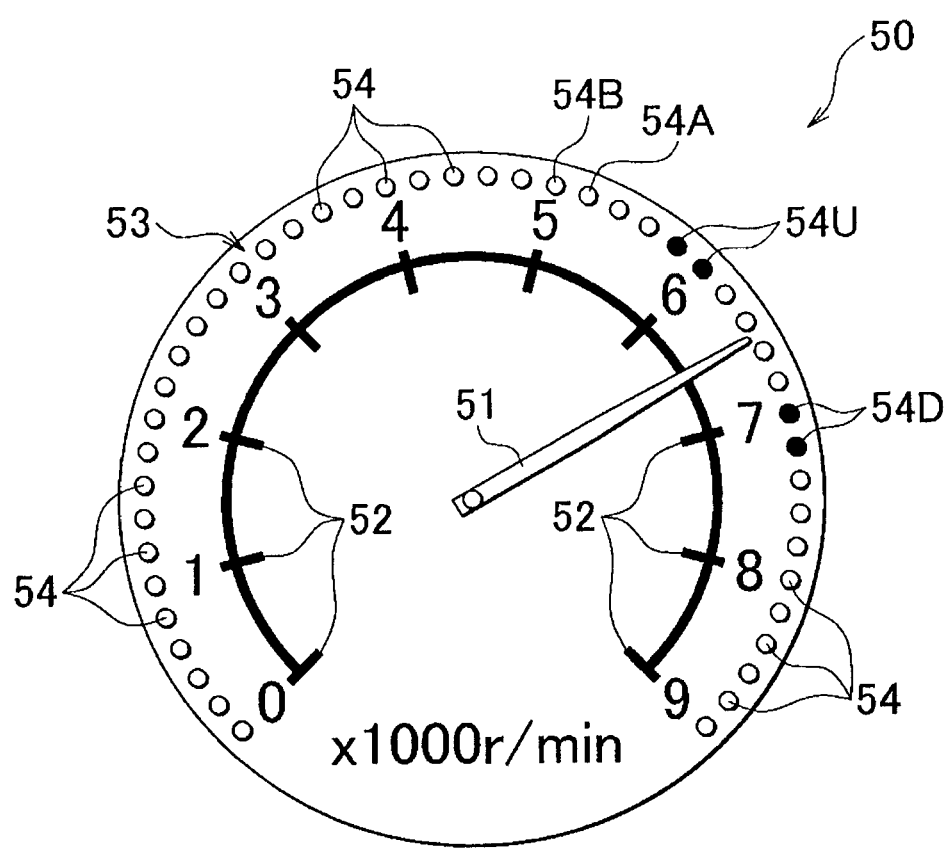
FIG. 4 is an illustration showing a tachometer of the embodiment shown in FIG. 1.

FIG. 1 is a schematic diagram showing respective general structures of an indicator and an engine of a first embodiment of this invention. The indicator in this embodiment indicates a present engine speed and an engine speed that is given after a gear shift operation of a transmission and is calculated based upon the present engine speed. In this embodiment, a tachometer shown in FIG. 4 is used as an engine speed indicator to indicate the present engine speed and the engine speed given after the gear shift operation of the transmission. The tachometer will be described in more detail later.

With reference to FIG. 1, the overall structure of the engine will be described. FIG. 1 only shows a structure of one cylinder of the engine. Additionally, the engine in this embodiment does not have a variable valve lift system. Another embodiment applied to an engine having such a variable valve lift system will be described later.

The engine 1 is a gasoline direct injection type, six-cylinder engine having six cylinders (cylinder #1 through cylinder #6). The engine 1 has pistons 10 defining combustion chambers 1a and a crankshaft 15 functioning as an output shaft. The pistons 10 are connected to the crankshaft 15 through respective connecting rods 16 so that the reciprocal movement of the pistons 10 is changed to the rotational movement of the crankshaft 15 by the connecting rods 16.

Additionally, the application of this invention is not limited to direct injection engines and may be applied to, for example, a port injection engines. Furthermore, the application of this invention is limited to the six-cylinder engines and may be applied to engines having the other number of cylinders (for example, four cylinders, eight cylinders and so forth). Further, this invention is not limitedly applied to an inline engine and can be applied to other types of engines (for example, a V type engine, a horizontally opposed engine, a rotary engine and so forth). Still further, this invention is not limitedly applied to the gasoline engine and can be applied to a diesel engine and so forth.

A transmission 40 having multiple gears (for example, first gear through fifth gear) is coupled with the engine 1. The rotation of the crankshaft 15 of the engine 1 is transmitted to the transmission 40 through a flywheel and a clutch (not shown). The power of the engine 1 thus is transmitted to the transmission 40. The transmission 40 is constructed to make a gear shift operation. That is, a shift lever 60 placed adjacent to a driver's seat is operated to mechanically change gear combinations of the transmission 40. The shift lever 60 has a gear position sensor 61 to determine a present gear position SP. The gear position sensor 61 outputs a gear position signal corresponding to the gear position SP of the shift lever 60. In this embodiment, the gear position sensor 61 outputs one of gear position signals given corresponding to the gears of the shift lever 60, i.e., the first gear position through the fifth gear position, a reverse gear position (R) and a neutral (N), in accordance with the present gear position SP.

The crankshaft 15 has a ring gear 17. The ring gear 17 meshes with a pinion 18 of a starter motor 7, which is activated for starting the engine 1. With the activation of the starter motor 7, the ring gear 17 rotates to crank the engine 1.

A signal rotor 19 is mounted to the crankshaft 15. The periphery of the signal rotor 19 has multiple projections (teeth) 19a. A crankshaft position sensor 35 is placed adjacent to the periphery of the signal rotor 19. The crankshaft position sensor 35 is, for example, an electromagnetic pick-up sensor. The crankshaft position sensor 35 thus generates pulse signals (crankshaft angle signals) corresponding to the projections 19a of the signal rotor 19 when the crankshaft 15 rotates.

Ignition plugs 3 are disposed at the combustion chambers 1a of the engine 1 per cylinders #1 through #6. An igniter 4 adjusts an ignition timing of each ignition plug 3. The engine 1 has a coolant temperature sensor 31 detecting the temperature of coolant circulating through the water jacket 1b.

Intake passages 11 and exhaust passages 12 are connected to each combustion chamber 1a of the engine 1. An intake valve 13 is disposed between each intake passage 11 and the combustion chamber 1a. Each intake valve 13 is driven to move between an open position and a closed position. The associated intake passage 11 and combustion chamber 1a thus communicate or do not communicate with each other. An exhaust valve 14 is disposed between each exhaust passage 12 and the combustion chamber 1a. Each exhaust valve 14 is driven to open and close, whereby the communication between associated exhaust passage 12 and combustion chamber 1a is allowed or interrupted. Rotations of an intake camshaft 21 and an exhaust camshaft 22 caused by the rotation of the crankshaft 15 open and close the intake vales 13 and the exhaust valves, respectively.

A cam position sensor 36 is placed adjacent to the intake camshaft 21 to distinguish a particular cylinder. The cam position sensor 36 is, for example, an electromagnetic pick-up sensor. The cam position sensor 36 is positioned in such a manner that the sensor 36 can oppose to one projection (tooth) extending from a periphery of a rotor, which may be integrally formed with the intake camshaft 21. Therefore, the cam position sensor 36 generates a pulse signal every one rotation of the intake camshaft 21.

A throttle valve 5 is disposed upstream of the intake passages 11 to adjust the intake air amount of the engine 1. A throttle valve motor 6 drives the throttle valve 5. A throttle valve position sensor 34 detects the opening degree of the throttle valve 5. A vacuum sensor 32 is disposed in the intake passage 11 downstream of the throttle valve 5 to detect an internal pressure of the intake passage 11 (intake pressure). A three-way catalyst 8 is disposed in at least one of the exhaust passages 12 of the engine 1.

The engine 1 has injectors (fuel injection valves) 2 disposed for cylinder #1 through #6 to directly inject fuel into the associated combustion chambers 1a. That is, highly pressurized fuel is supplied to the injectors 2 of the respective cylinders and the fuel is directly sprayed into the combustion chambers 1a by the respective injectors 2. Thereby, air supplied through the intake passages 11 and the fuel are mixed in each combustion chamber 1a to form an air-fuel mixture. The air-fuel mixture is ignited by the ignition plug 3 to be burned in the combustion chamber 1a. The combustion of the air-fuel mixtures in the combustion chambers 1a make the respective pistons 10 reciprocate to rotate the crankshaft 15.

Figure 2:
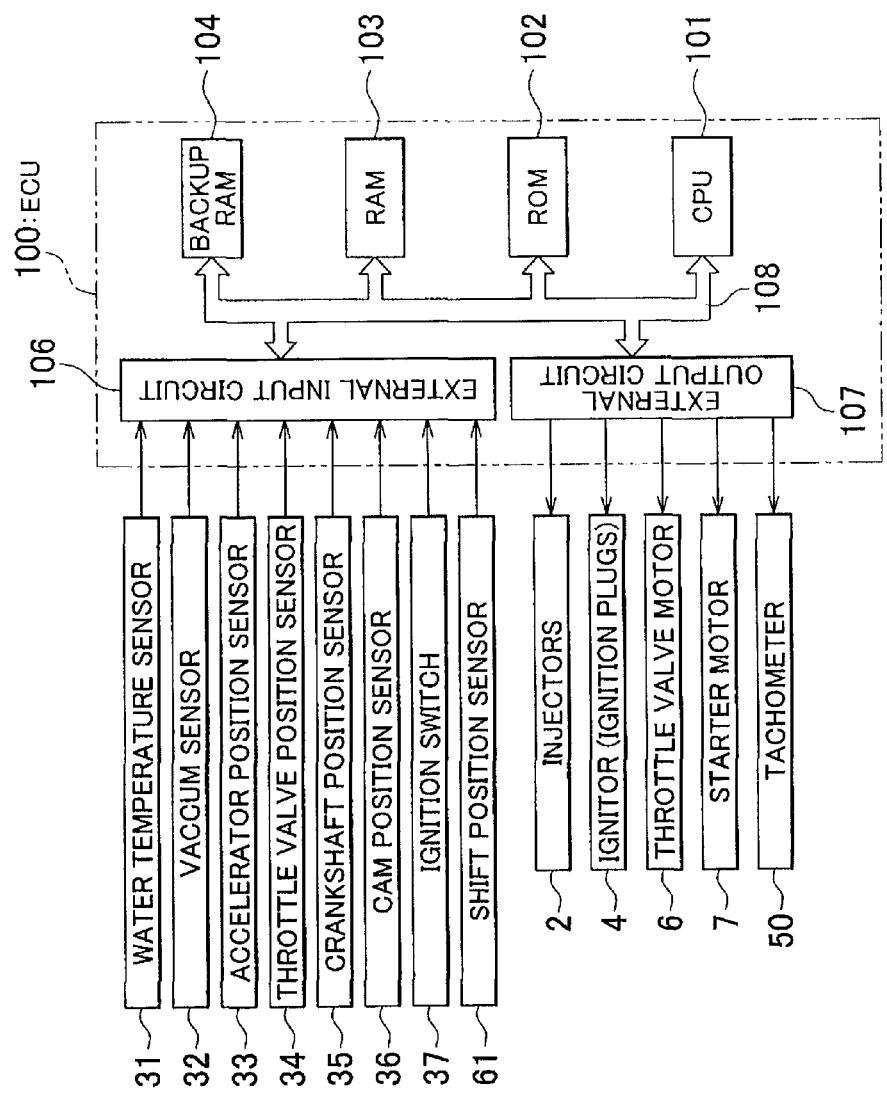
FIG. 2 is a block diagram showing a control system of the embodiment shown in FIG. 1 including an ECU.

An electronic control unit (ECU) 100 controls the operational conditions of the engine 1 constructed as described above. As shown in FIG. 2, the ECU 100 has a CPU 101, a ROM 102, a RAM 103 and a backup RAM 104.

The ROM 102 stores various control programs, maps that are referred to when the respective control programs are executed, and other information. The ROM 102 also stores information about gearshift ratios (gear ratios) of the transmission 40 and information about the permissible maximum engine speed (engine speed limit) NEmax. The CPU 101 executes calculation processes based upon the respective control programs and maps stored in the ROM 102. The RAM 103 is a memory that temporarily stores the calculated results of the CPU 101, data received from respective sensors and other information. The backup RAM 104 is a non-volatile memory that stores data or information that need to be preserved when the engine 1 stops. The ROM 102, the CPU 101, the RAM 103 and the backup RAM 104 are connected to each other through a bus 108 and also are connected to external input circuits 106 and external output circuits 107.

The coolant temperature sensor 31, the vacuum sensor 32, an accelerator position sensor 33, the throttle valve position sensor 34, the crankshaft position sensor 35, the cam position sensor 36, an ignition switch 37, the gear position sensor 61, etc. are connected to the external input circuit 106. The injectors 2, the igniter 4 for the ignition plugs 3, the throttle valve motor 6 for the throttle valve 5, the starter motor 7, a tachometer 50 which will be described later, etc. are connected to the external output circuit 107.

The ECU 100 executes the respective controls of the engine 1 based upon outputs of the respective sensors including the coolant temperature sensor 31, the vacuum sensor 32, the accelerator position sensor 33, the throttle valve position sensor 34, the crankshaft position sensor 35, the cam position sensor 36 and the gear position sensor 61 to control the operational conditions of the engine 1. The ECU 100 also executes engine speed indicating processes for indicating the present engine speed of the engine 1 and the engine speed given after the gear shift operation of the transmission 40 shown by the tachometer 50. The engine speed indicating processes executed by the ECU 100 will be described below.

With reference to FIG. 4, first, the tachometer 50 will be described. The tachometer 50 shown in FIG. 4 is an engine speed indicator that indicates the present engine speed of the engine 1 and the engine speed given after the gear shift operation of the transmission 40. The tachometer 50 forms a portion of a combination meter unit disposed in front of the driver's seat.

In the tachometer 50, a needle 51 points the present engine speed. That is, the needle 51 indicates the present engine speed (primary engine speed indicator). The present engine speed is indicated based upon the output of the crankshaft position sensor 35. The higher the present engine speed, the greater the rotational angle of the needle 51 that rotates clockwise. The tachometer 50 has a plurality of scale points 52 at predetermined angular intervals in a rotational angle range of the needle 51. In FIG. 4, the scale points 52 are provided every 1,000-rpm of the engine speed.

On the other hand, the engine speed given after the gear shift operation of the transmission 40 is indicated in indication section 53. That is, the indication section 53 indicates the engine speed given after the gear shift operation of the transmission 40 (auxiliary engine speed indicator). The indication section 53 is formed with a plurality of LED units 54 arranged at predetermined angular intervals. In FIG. 4, the LED units 54 are positioned at every 200-rpm of engine speed. That is, the LED units 54 are positioned one by one at the respective engine speed 0, 1,000 through 8,000 and 9,000 rpm just around the respective scale points 52, and four LED units 54 are provided between the adjacent scale points 52. Each LED unit 54 is formed with a circular transparent part and two LEDs disposed on the reverse side of the transparent part. Each respective LED emits light of different color. In this embodiment, each LED unit 54 has an LED that emits green light and an LED that emits red light.

Indication modes of the indication section 53 (light emitting modes of the LED units 54) are provided as follows: One LED unit 54 of the indication section 53 emits light in arithmetically corresponding to an engine speed given after a gear shift operation and calculated as described later. In this connection, because the LED units 54 are arranged every 200-rpm of engine speed, the clause "LED unit(s) corresponding to the engine speed given after the gear shift operation" is used in the following meaning.

If an engine speed given after a gear shift operation is a multiple number of intervals of the engine speed whereby the LED units 54 are arranged (i.e., 200-rpm in this embodiment), one LED unit 54 representing the particular engine speed is the "LED unit corresponding to the engine speed given following the gear shift operation." For example, if the engine speed given after the gear shift operation is 5,200 rpm, LED unit 54A of FIG. 4 is the LED unit corresponding to the engine speed given after the gear shift operation.

Meanwhile, if an engine speed given after a gear shift operation is not a multiple of the engine speed intervals at which the LED units 54 are arranged, the two LED units 54 that neighbor each other and are positioned to represent an engine speed higher than the particular engine speed (i.e., positioned next thereto in the clockwise direction of FIG. 4) and an engine speed lower than the particular engine speed (i.e., positioned next thereto in the counterclockwise direction of FIG. 4) are the "LED units corresponding to the engine speed given after the gear shift operation." For example, if the engine speed given after the gear shift operation is 5,1000 rpm, LED units 54A and 54B of FIG. 4 are the LED units corresponding to the engine speed given after the gear shift operation.

If the transmission 40 is upshifted (for example, from the fourth gear position to the fifth gear position), the engine speed decreases. As a result, one or two LED units 54 (for example, the LED units 54U of FIG. 4) corresponding to the engine speed given after the gear shift operation, which changes the gear position to the next higher gear (i.e. placed in the lower engine speed range than the needle 51 pointing the scale point of the present engine speed), are lit. In this case, the green LEDs of the LED units 54U are lit.

On the other hand, if the transmission 40 is downshifted (for example, from the fifth gear position to the fourth gear position), the engine speed increases. As a result, one or two LED units 54 (for example, the LED units 54D of FIG. 4) corresponding to the engine speed given after the gear shift operation, which changes the gear position to the next position (i.e. placed in the higher engine speed range than the needle 51 pointing the scale point of the present engine speed), are lit. In this case, unless the engine speed given after gear shift operation exceeds the permissible maximum engine speed NEmax (for example, 8,000 rpm), the green LEDs of the LED units 54D are lit. If, instead, the engine speed given after the gear shift operation were to exceed the permissible maximum engine speed NEmax, the indication section 53 indicates in another indication mode that is different from the indication mode discussed above to warn the driver that over revolution is expected when the gear shift operation is made. Specifically, the red LEDs of the LED units 54D would be lit. As thus described, the indication section 53 is an over revolution indicator that indicates the engine will likely be over-revved if the gear shift operation is made.

Figure 3:
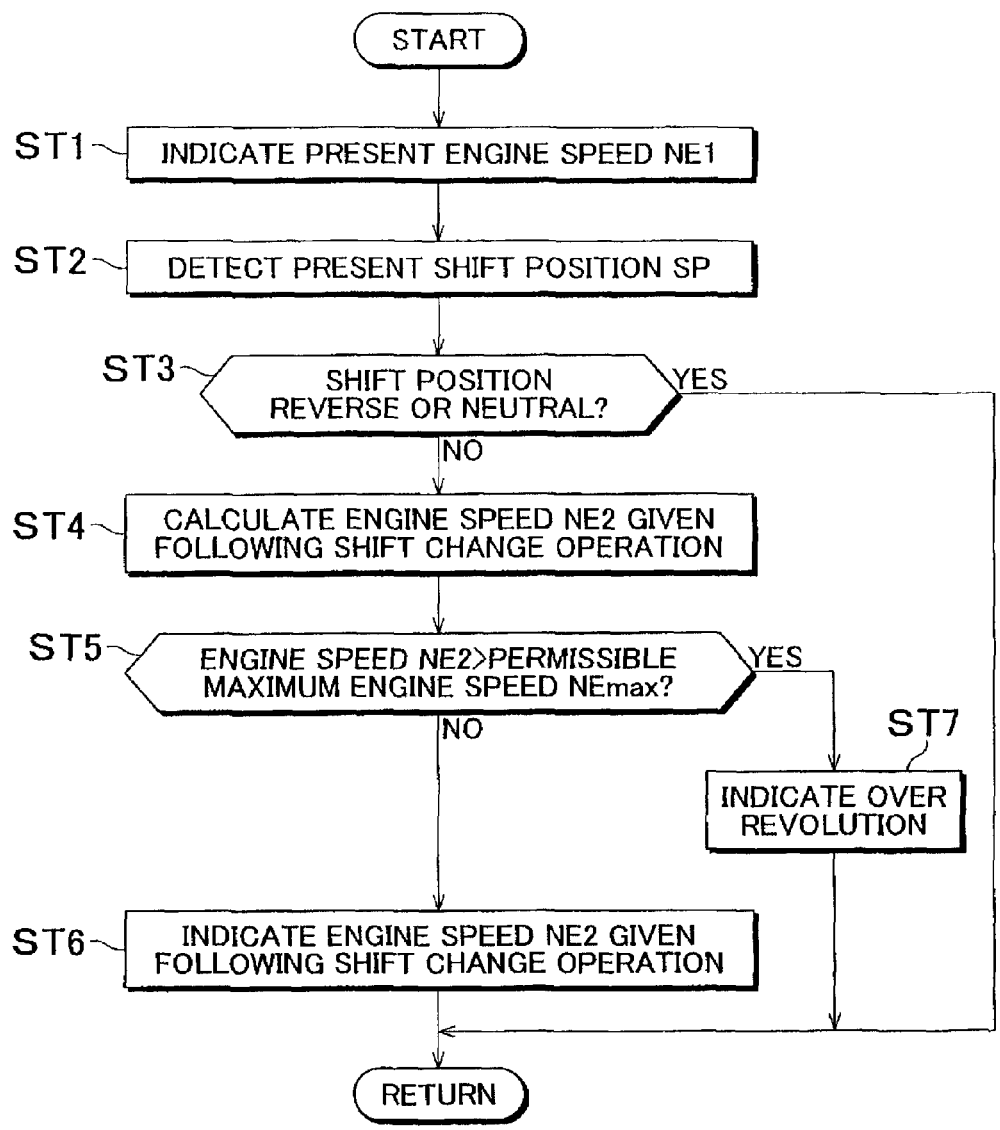
FIG. 3 is a flowchart for engine speed indicating processes executed by the ECU of the embodiment shown in FIG. 1.

Next, with reference to a flowchart of FIG. 3, the engine speed indicating processes executed by the ECU 100 will be described below. This engine speed indicating routine of FIG. 3 is executed every preset crankshaft angle.

At step ST1, the ECU 100 reads a present engine speed NE1 of the engine 1 from the output of the crankshaft position sensor 35 and indicates the present engine speed NE1 by the needle 51 of the tachometer 50. Because of this indication, the driver can recognize the present engine speed NE1.

The ECU 100, at step ST2, reads a present gear position SP from the output of the gear position sensor 61. The gear position SP of the shift lever 60 detected by the gear position sensor 61 is any one of the first through fifth gear, the reverse gear and the neutral. Next, the ECU 100 determines whether the gear position SP that has been read in is the reverse or the neutral. If the gear position SP is reverse or neutral, the routine ends.

Meanwhile, if the gear position SP is neither reverse nor neutral in the determination of step ST3, the ECU 100 goes to step ST4.

At step ST4, the ECU 100 calculates engine speeds NE2 given after gear shift (gear change) operations that change the gear to the next higher and lower gear based upon the present engine speed NE1. Specifically, in this embodiment, the ECU 100 calculates, on this occasion, both of engine speeds given after the gear shift operation to the next higher gear and the gear shift operation to the next lower gear. The calculation is made by multiplying the present engine speed NE1 read in at step ST1 and the gear ratios (gear ratios given after the gear shift operations/present gear ratio) read out from the ROM 102 together. That is, in this calculation, the ECU 100 refers to the information about the gear ratios stored in the ROM 102. If the present gear position SP is the lowest position, i.e., the first gear position, only the engine speed given after the gear shift operation to the next higher gear (from the first gear position to the second gear position) is calculated. If the present gear position SP is the highest position, i.e., the fifth gear position, only the engine speed given after the gear shift operation to the next lower gear position (from the fifth gear position to the fourth gear position) is calculated.

Next, at step ST5, the ECU 100 determines whether the engine speed NE2 which relates to the downshift operation to the lower gear position exceeds the permissible maximum engine speed NEmax of the engine 1 read out from the ROM 102 or not. That is, in this determination, the ECU 100 refers to the information about the permissible maximum engine speed NEmax of the engine 1 stored in the ROM 102. Additionally, because the engine speed decreases when the upshift operation is made, it is sufficient to determine the engine speed NE2 given when the downshift operation is made.

If the engine speed NE2 given after the gear shift does not exceed the permissible maximum engine speed NEmax of the engine 1, the ECU 100, at step ST6, controls the tachometer 50 to indicate the engine speed NE2 given after the gear shift operation and calculated at step ST4 in the indication section 53. The specific indication mode in the indication section 53 is as follows: That is, the respective LED units 54 corresponding to both of the engine speeds given after the gear shift operations to the next positions emit green light. If the present gear position SP is the lowest position, i.e. the first gear position, only the LED unit(s) corresponding to the engine speed given after the gear shift operation to the next higher gear position (from the first gear position to the second gear position) emits light. If the present gear position SP is the highest position, i.e., the fifth gear position, only LED unit(s) corresponding to the engine speed given after the gear shift operation to the next lower gear position (from the fifth gear position to the fourth gear position) emits light.

The indication informs the driver with the position(s) and the color of the particular LED unit(s) 54 which emits light. Therefore, the driver can prospectively recognize the engine speed NE2 given after the gear shift operation. Also, the driver can prospectively recognize that no over revolution is expected even though the gear shift operation is made. Afterwards, the ECU 100 temporarily ends this routine.

In the meantime, if the engine speed NE2 given after the gear shift operation would exceed the permissible maximum engine speed NEmax of the engine 1 in the determination of step ST5, the ECU 100, at step ST7, controls the tachometer 50 to indicate that the over revolution is expected when the gear shift operation is made in the indication section 53 (over revolution indication). The specific indication mode of the indication section 53 is as follows: That is, the LED unit(s) 54 corresponding to the engine speed given after the gear shift operation to the next higher gear and placed in the lower engine speed range than the needle 51 of the tachometer 50 emits green light, and the LED unit(s) 54 corresponding to the engine speed given after the gear shift operation to the next lower position and placed in the higher engine speed range than the needle 51 emits red light.

The indication informs the driver with the positions and the color(s) of the particular LED unit(s) 54 which emits light. Therefore, the driver can prospectively recognize the engine speed NE2 given after the gear shift operation to the next gear and also can prospectively recognize that the over revolution is expected when the gear shift operation is made. Afterwards, the ECU 100 temporarily ends this routine.

As results of the engine speed indications discussed above, the following actions and effects can be obtained. Because of the indications by the needle 51 and the indication section 53 of the tachometer 50, the driver can not only recognize the present engine speed but also prospectively (before the gear shift operation) recognize the engine speed given after the gear shift operation of the transmission 40. The engine 1 has its own engine speed range for good fuel economy and engine speed range in which the high output/high torque operation is provided. Because the driver can prospectively recognize the upcoming engine speed given after the gear shift operation, the driver can always take account of such speed ranges while driving the car. The drive suitable for the driver's preference thus is practicable. Consequently, the drivability can be enhanced. For example, the driver may change gears after recognizing that the engine speed given after the gear shift operation is within the engine speed range for good fuel economy. The driving with the excellent fuel economy can be realized, accordingly.

As discussed above, when the transmission is downshifted the engine speed increases. As a result, the engine speed NE2 given after the gear shift operation may exceed the permissible maximum engine speed NEmax of the engine 1 to result the over revolution. Conventional indicators, however, do not provide any useful indications whereby the driver can prospectively recognize whether the engine speed will exceed the permissible maximum engine speed of the engine or the gear shift operation is made. In other words, there is the problem that the driver cannot prospectively recognize whether the over revolution is expected or not when the gear shift operation is made. However, in this embodiment, the indication modes of the indication section 53 (light emitting modes of the LED units 54) are different between the state that the over revolution is expected and the state that no over revolution is expected. Therefore, the driver can prospectively recognize whether over revolution is expected when the gear shift operation is made, by distinguishing the light emitting modes of the LED units 54 in the indication section 53 from each other, i.e., the luminous colors of the LED units 54 in this embodiment. As a result, over revolution can be prevented from occurring. Also, the driver can make the gear shift operation at ease. Accordingly, driving safety can be improved.

Next, variations will be described below. Although the above embodiment in which the tachometer 50 functions as the indicator is provided to a car with a manual transmission, the invention may also be applied to an automatic transmission that has a manual shifting mode. An automatic transmission having such a manual shifting mode is specifically described in JP-A-Hei 10-175461.

The number of gears of the transmission 40 is not limited to any particular number, and may be less than four speeds or greater than six speeds.

The structure, indication modes etc. are not limited to those described above. Although the LED units 54 are positioned every 200 rpm of the engine speed in the above embodiment, the intervals between the respective LED units 54 can be appropriately changed. For example, the LED units 54 can be positioned every 100 rpm of the engine speed. The luminous colors of the LED elements and the number of the LED elements belonging to the respective LED units 54 are also changeable.

Another needle, similar to the needle 51 used to indicate the present engine speed, may be used to indicate the engine speed given after the gear shift operation. It is preferable to differ the respective colors, lengths, thicknesses and so forth of the needle indicating the present engine speed and of the needle indicating the engine speed given after the gear shift operation from each other.

A liquid crystal indication unit may be used instead of the LED units 54 to indicate the engine speed given after the gear shift operation. A meter panel employing a liquid crystal indication unit may be used in place of the tachometer 50 of FIG. 4 to indicate both of the present engine speed and the engine speed given after the gear shift operation. In this connection, the meter panel can employ a liquid crystal indication unit that has the same pattern as that of the tachometer including the needle and the indication section shown in FIG. 4. Also, the meter panel can employ another liquid crystal indication unit to indicate the present engine speed and the engine speed given after the gear shift operation in numerals. Further, in this connection, different backlight colors may be used to indicate when over revolution is expected and when no over revolution is expected. Thereby, over revolution can be indicated.

The clause "LED unit(s) corresponding to an (the) engine speed given after a (the) gear shift operation" may also be used in the following meaning in addition to the meaning described above. First, an example will be described. If the engine speed given after the gear shift operation is 5,100 rpm, the LED unit 54B of FIG. 4 is used as the LED unit corresponding to the engine speed given after the gear shift operation to the next higher gear. To the contrary, at the same engine speed, the LED unit 54A of FIG. 4 is used as the LED unit corresponding to the engine speed given after the gear shift operation to the next lower gear. As thus described, if the engine speed given after the gear shift operation is greater than the engine speed indicated by LED unit 54 placed at a certain position (for example, the LED unit 54 is the LED unit 54B of FIG. 4 indicating the engine speed 5,000 rpm) and the engine speed is less than the engine speed indicated by the LED unit 54 neighboring in the higher speed range (i.e., the LED unit 54 is the LED unit 54A indicating the engine speed 5,200 rpm), the LED unit 54 placed at the certain position is the "LED unit corresponding to the engine speed given after the gear shift operation" under the condition that the transmission is upshifted. To the contrary, the LED unit 54 neighboring the higher speed range is the "LED unit corresponding to the engine speed given after the gear shift operation" when the transmission is downshifted.

In the embodiment and variations described above, the indicator indicates the engine speed given after the gear shift operation to the next gear position (for example, from the fifth gear position to the fourth gear position). However, in addition to the engine speed given after the one-step gear shift operation, the engine speed given after a two-step gear shift operation (for example, from the fifth gear position to the third gear position) may be indicated. In this connection, preferably, the indication modes of the indication section 53 can be different between the state in which the engine speed given after the one-step gear shift operation is indicated and the state in which the engine speed given after the two-step gear shift operation is indicated. For example, each LED unit 54 can have three types of LEDs whose luminous colors are different from each other (green LED, red LED and blue LED). The engine speed given after the one-step gear shift operation may be indicated by the lighted green LED and the engine speed given after the two-step gear shift operation may be indicated by the blue LED.

In the embodiment and variations described above, the over revolution warning is provided by the LED unit(s) 54 corresponding to the engine speed given after the shift operation and emitting red light. However, the indication for warning of the over revolution by the indication section 53 is not limited to such a mode. In other words, it is only required that the indication modes are different between the state in which the over revolution is expected and the state in which no over revolution is expected. For example, the LED unit(s) 54 can intermittently emit the red light (i.e., blinking of the indicator). Also, the LED unit(s) 54 can intensely emits the red light. If the mode in which the LED units 54 intensely emit the red light is applied, each LED unit 54 of the indication section 53 can have one green LED whose luminous color is green and multiple (for example, two) red LEDs and all of the multiple red LEDs are lighted to warn the over revolution.

Although the indication section 53 for indicating the engine speed given after the gear shift operation is used to warn of over revolution, an over revolution indicator can be independently provided to warn of over revolution.

In the embodiment and variations described above, the engine speed given after the gear shift operation is indicated in the indication section 53 all the time. The indicator, however, may be constructed in such a manner that indication and non-indication conditions are selectively switched to one another. In this connection, the indication and non-indication conditions of the indication section 53 may be switched when the clutch is operated. Also, a switch or the like can be provided for switching the indication and non-indication conditions of the indication section 53 when the switch is operated.

The engine in the embodiment and variations described above has no variable valve lift system. A second embodiment in which the invention is applied to an engine having the variable valve lift system will be described in detail below.

Figure 5:
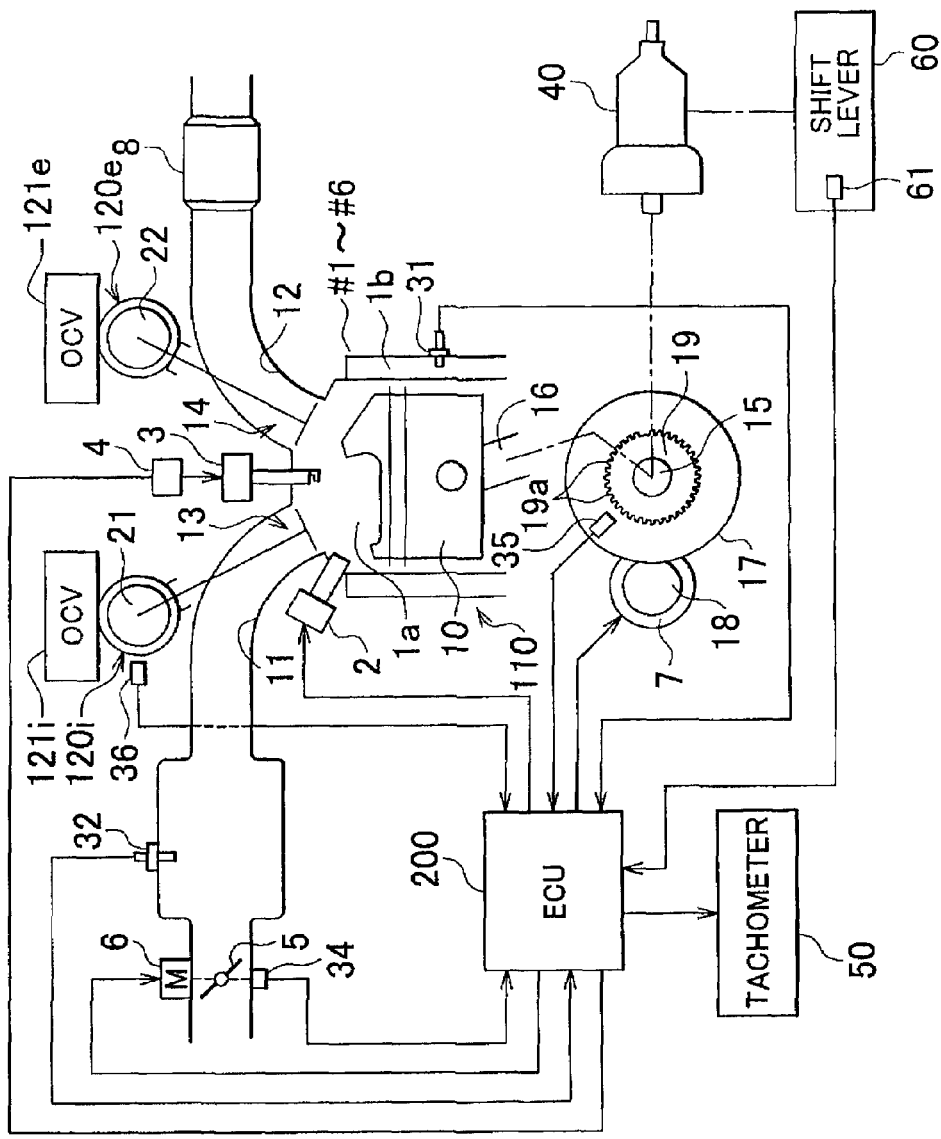
FIG. 5 is a schematic diagram showing an overall structure of a device of a second embodiment of the indicator for a vehicle.

As shown in FIG. 5, an engine 110 in this embodiment is the same as the engine 1 of FIG. 1 in the first embodiment described above except that a variable valve lift system 120 is added. The same devices, components, units and members in this embodiment as those of the engine 1 in the above embodiment are assigned with the same reference numerals, and symbols and will not be described repeatedly.

The variable valve lift system 120 includes a low speed cam and a high speed cam both disposed on each camshaft and changed to one another in accordance with an operational condition of the engine 110 to vary the valve lift amounts of the respective valves of the engine 110. An oil control valve (OCV) 21 changes the low speed cam and the high speed cam of the variable valve lift system 120 to one another. FIG. 5 shows a structure in which the engine 110 has a variable valve lift system 120*i* and an OCV 121*i* for varying valve lift amounts of the intake valves 13 and a variable valve lift system 120*e* and an OCV 121*e* for varying valve lift amounts of the exhaust valves 14. Alternatively, a single and common OCV can be provided for the variable valve lift system 120*i* used for the intake valves 13 and for the variable valve lift system 120*e* used for the exhaust valves 14. In a further variation, the engine 110 can have either one of the variable valve lift system 120*i* used for the intake valves 13 and for the variable valve lift system 120*e* used for the exhaust valves 14.

Each low-speed cam is used when the engine speed of the engine 110 is less than a preset cam change engine speed M (for example, 6,000 rpm). Each high-speed cam is used when the engine speed of the engine 110 is greater than the preset cam change engine speed M. The low-speed cam and the high-speed cam of each variable valve lift system 120*i*, 120*e* are changed to one another (the term "cam change(s)" can be used below) when the associated OCV 121*i*, 121*e* changes a pressurizing direction of working oil delivered to the variable valve lift system 120*i*, 120*e*. Additionally, the following descriptions will be provided on the premise that the cams of the respective variable valve lift systems 120i and 120e are changed at the same cam change engine speed M.

Figure 8:
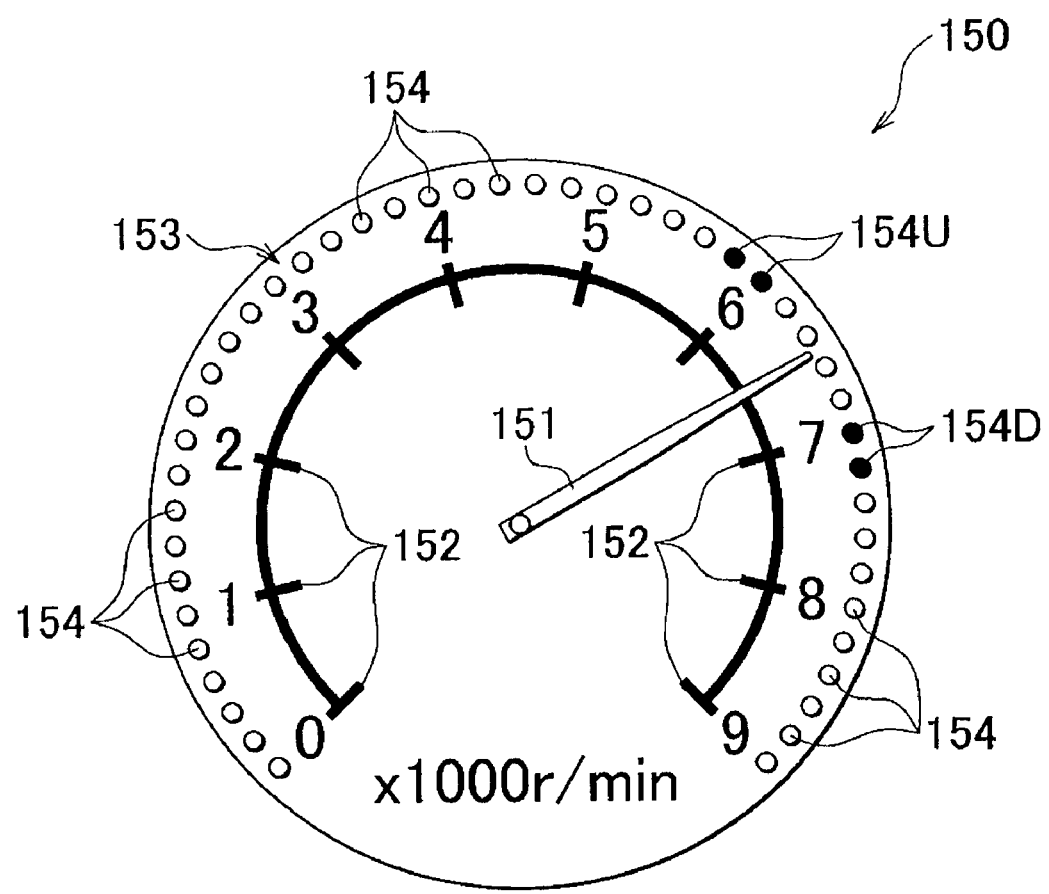
FIG. 8 is an illustration showing a tachometer of the second embodiment shown in FIG. 5.

As shown in FIG. 8, a tachometer 150 in this embodiment has a needle 151 provided as the present engine speed indicator (primary engine speed indicator) of the engine 110. An indication section 153 of the tachometer 150 is the engine speed indicator for indicating the engine speed given after the gear shift operation of the transmission 40 (auxiliary engine speed indicator). The indication section 153 also functions as an over revolution indicator for indicating that the over revolution is expected when the gear shift operation is completed. The tachometer 150 has the same structure as that of the tachometer 50 of FIG. 1 described above except for that the indication modes of the indication section 153 (light emitting modes of the LED units 154) are slightly different from the indication modes of the indication section 53 (light emitting modes of the LED units 54) of the first embodiment described above.

The following indication modes of the indication section 153 are the same as those of the indication section 53 of the above embodiment. That is, if the transmission 40 is upshifted, one or two LED units 154 (for example, the LED units 154U of FIG. 8) corresponding to the engine speed given after the gear shift operation which changes the gear to the next higher gear (i.e. placed in the lower engine speed range than the needle 151 pointing the present engine speed; in the range in the counterclockwise direction of FIG. 8) emit green light. If the transmission 40 is downshifted, one or two LED units 154 (for example, the LED units 154D) corresponding to the engine speed given after the gear shift operation which changes the gear position to the next lower gear (i.e. placed in the higher engine speed range than the needle 51 pointing the present engine speed; in the range in the clockwise direction of FIG. 8) emit green light. When downshifting, if the engine speed given after the gear shift operation exceeds the permissible maximum engine speed NEmax, the LED units 154D will emit red light to warn the driver that the over revolution is expected when the gear shift operation is made.

In addition to such indication modes of the indication section 153, if the cams of the variable valve lift system 120i, 120e are changed, the indication section 153 informs the driver of the cam changes in this embodiment. Specifically, if the transmission 40 is upshifted, one or two LED units 154 corresponding to the engine speed given after the gear shift operation and placed in the lower engine speed range than the needle 151 pointing the present engine speed intermittently emit red light to inform the driver that the high speed cams currently will be changed to the low speed cams. Meanwhile, if the transmission 40 is downshifted, one or two LED units 154 corresponding to the engine speed given after the gear shift operation placed in the higher engine speed range than the needle 151 pointing the present engine speed intermittently emit red light to inform the driver that the low speed cams currently used will be changed to the high speed cams. As thus discussed, the indication section 153 functions as a cam change indicator for the variable valve lift systems 120i and 120e. That is, the indication section 153 indicates that the variable valve lift systems 120i and 120e will change cams changes by when the gear of the transmission 40 is changed.

Figure 6:
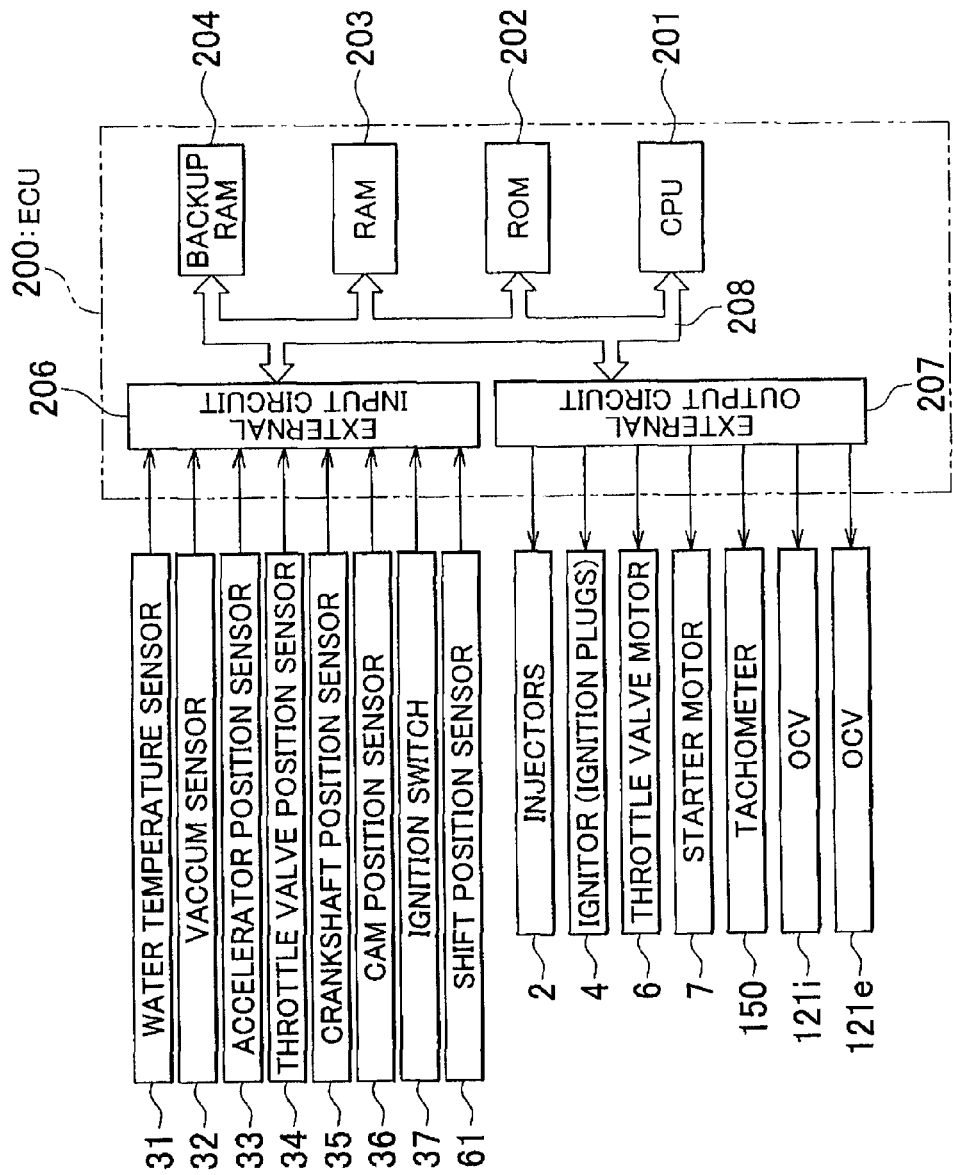
FIG. 6 is a block diagram showing a control system of the second embodiment shown in FIG. 5 including an ECU.

As shown in FIG. 6, the ECU 200 for controlling an operational condition of the engine 110 has a CPU 201, a ROM 202, a RAM 203 and a backup RAM 204. The ROM 202, the CPU 201, the RAM 203 and the backup RAM 204 are connected to each other through a bus 208 and also are connected to external input circuits 206 and external output circuits 207. The ROM 202 stores information about gearshift ratios (gear ratios) of the transmission 40, information about the permissible maximum engine speed NEmax and information about the cam change engine speed M of the variable valve lift systems 120i and 120e.

The coolant temperature sensor 31, the vacuum sensor 32, an accelerator position sensor 33, the throttle valve position sensor 34, the crankshaft position sensor 35, the cam position sensor 36, the ignition switch 37, the gear position sensor 61, and other components are connected to the external input circuit 206. The injectors 2, the igniter 4 for the ignition plugs 3, the throttle valve motor 6 for the throttle valve 5, the starter motor 7, the OCVs 121i and 121e, the tachometer 150, etc. are connected to the external output circuit 207.

The ECU 200 executes the respective controls of the engine 110 based upon the outputs of the respective sensors including the coolant temperature sensor 31, the vacuum sensor 32, the accelerator position sensor 33, the throttle valve position sensor 34, the crankshaft position sensor 35, the cam position sensor 36 and the gear position sensor 61 to control the operational conditions of the engine 110. The ECU 200 also executes engine speed indicating processes for indicating the present engine speed of the engine 110 and the upcoming engine speed thereof given following the gear shift operation of the transmission 40 by the tachometer 150.

Figure 7:
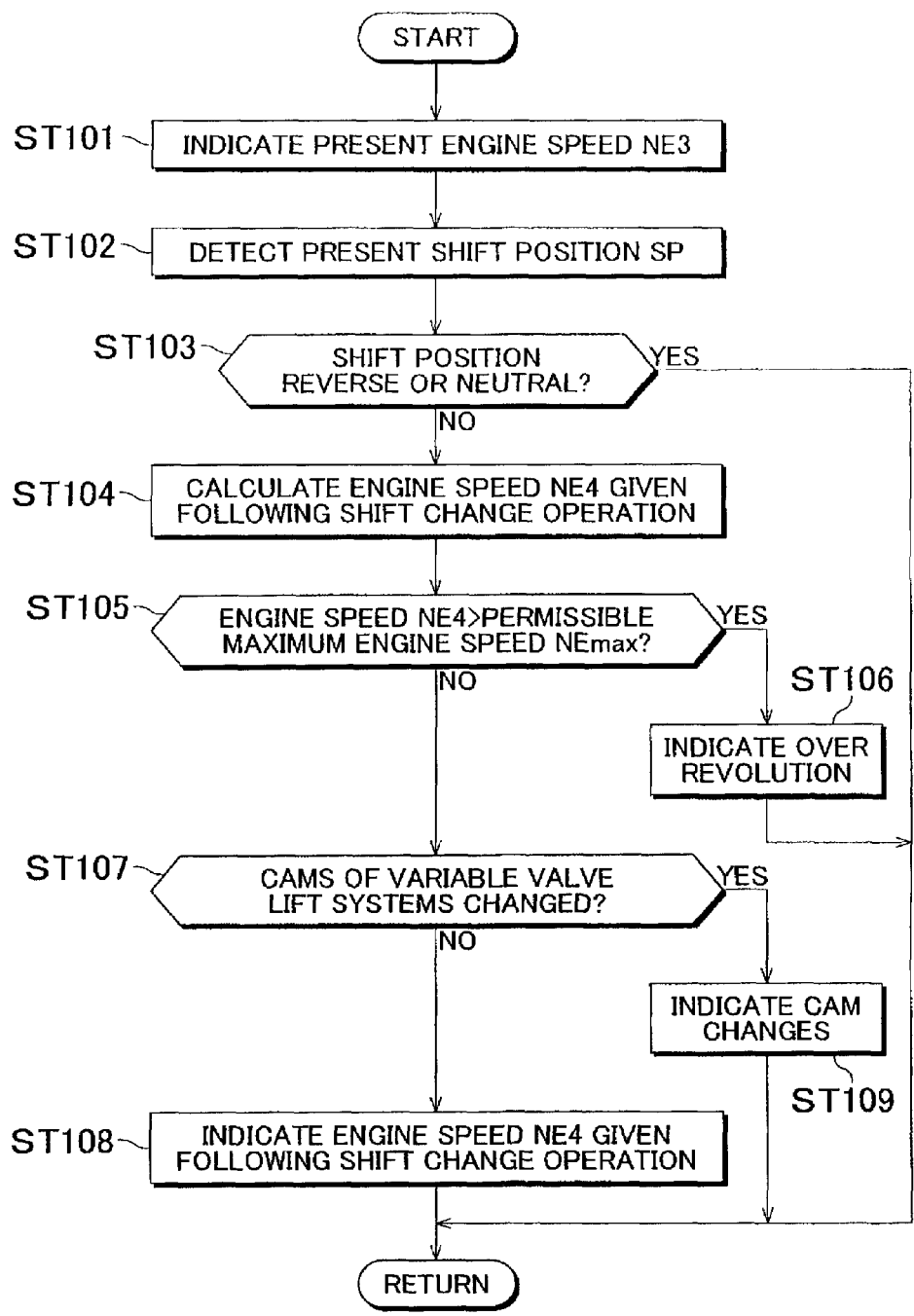
FIG. 7 is a flowchart for engine speed indicating processes executed by the ECU of the second embodiment shown in FIG. 5.

Next, with reference to a flowchart of FIG. 7, the engine speed indicating processes executed by the ECU 200 will be described below. This engine speed indicating routine of FIG. 7 is executed every preset crankshaft angle. This routine is formed with further steps relating to the cam change operations of the variable valve lift systems 120i and 120e in addition to steps of the routine of FIG. 3 described above. The steps relating to the cam change operations of the variable valve lift systems 120i and 120e are specifically step ST107 and step ST109. Other steps are the same as those of the routine of the first embodiment described above. The steps relating to the cam change operations of the variable valve lift systems 120i and 120e will be mainly described below.

Steps ST101 through ST106 correspond to steps ST1 through ST5 and ST7 (see FIG. 3) of the engine speed indicating routine of the first embodiment described above. If, in the determination at step ST105, the engine speed NE4 given after the gear shift operation to the next gear position and calculated based upon the present engine speed NE3 exceeds the permissible maximum engine speed NEmax of the engine 110, the over revolution is indicated at step ST106. In this embodiment, regardless of whether the cam changes by the variable valve lift systems 120i and 120e are made after the gear of the transmission 40 is changed, the indication of the over revolution is made before the indication of the cam changes so that safety is enhanced. Meanwhile, if the engine speed NE4 given after the gear shift operation does not exceed the permissible maximum engine speed NEmax of the engine 110, the ECU 200 goes to step ST107.

At step ST107, the ECU 200 determines whether the cams of the variable valve lift systems 120i and 120e are changed after the gear shift operation of the transmission 40 is completed. Because the cam changes by the variable valve lift systems 120i and 120e are made at the cam change engine speed M, the ECU 200 determines whether the engine speed varies beyond the cam change engine speed M while the gear shift operation is completed. That is, the ECU 200 determines whether the cam change engine speed M exists between the present engine speed NE3 and the engine speed NE4 given after the gear shift operation and calculated at step ST104. In this embodiment, the ECU 200 determines whether the present engine speed NE3 is larger than the cam change engine speed M and the engine speed NE4 given after the gear shift operation, calculated at step ST104, is smaller than the cam change engine speed M and also determines whether the present engine speed NE3 is smaller than the cam change engine speed M and the engine speed NE4 given after the gear shift operation, calculated at step ST104, is larger than the cam change engine speed M.

If, in the determination at step ST107, the cam changes by the variable valve lift systems 120i and 120e are not made after the gear is changed, i.e., if the engine speed does not vary beyond the cam change engine speed M once the gear shift operation is completed, the ECU 200, at step ST108, controls the tachometer 150 to indicate the engine speed NE4 given after the gear shift operation at step ST104 by the indication section 153. The ECU 200 controls the indication in the same manner as that executed at step ST6 of the engine speed indicating routine of the first embodiment described above. The indication informs the driver with the positions and the color of the LED units 154. Therefore, the driver can prospectively recognize the engine speed NE4 given after the gear shift operation to the next gear position and also can prospectively recognize that the cams of the variable valve lift systems 120i and 120e are not changed to one another even though the gear shift operation is made. Afterwards, the ECU 200 temporarily ends this routine.

Meanwhile, if, in the determination at step ST107, the cam changes by the variable valve lift systems 120i and 120e are made after the gear is changed, i.e., if the engine speed varies beyond the cam change engine speed M while the gear shift operation is made, the ECU 200, at step ST109, controls the tachometer 150 to indicate, by the indication section 153, that the cam changes by the variable valve lift systems 120i and 120e are made when the gear is changed (cam change indication). Specific indication modes of the indication section 153 are as follows: That is, if the cams are changed to the low speed cams when the transmission 40 is upshifted (for example, from the fourth gear position to the fifth gear position), one or two LED units 154, corresponding to the engine speed NE4 given after the gear shift operation to the next higher gear and placed in the lower engine speed range than the needle 151 pointing the present engine speed, intermittently emit red light. If the cams change to the high speed cams when the transmission 40 is downshifted (for example, from the fifth gear position to the fourth gear position), one or two LED units, 154 corresponding to the engine speed NE4 given after the gear shift operation to the next position and placed in the higher engine speed range than the needle 151 pointing the present engine speed, intermittently emit red light.

The indication informs the driver with the positions and the color of the particular LED unit(s) 154 which intermittently emit light. Therefore, the driver can prospectively recognize the engine speeds NE4 given after the gear shift operation to the next gear position and also can prospectively recognize that the cams of the variable valve lift systems 120i and 120e may be changed when the gear shift operation is completed. Afterwards, the ECU 200 temporarily ends this routine.

As results of the engine speed indication described above, the following actions and effects can be obtained in addition to the actions and effects of the engine speed indication in the first embodiment.

With a conventional indicator, the driver cannot prospectively recognize the engine speed given after a gear shift operation and whether cams of the variable valve lift systems 120i and 120e will change after the gear shift operation is completed. Therefore, even though the driver does not want to change from the low-speed cam to the high-speed cam, the cams may be changed by the variable valve lift systems 120i and 120e against the driver's intention. There arises a problem that the drivability is deteriorated, accordingly. Also, because the cam changes by the variable valve lift systems 120i and 120e can be made unexpectedly, the driver may not drive the car smoothly. The problem of the deterioration of the drivability can arise in this situation also.

To the contrary, in this embodiment, the indication modes of the indication section 153 (light emitting modes of the LED units 154) are different when the cams of the variable valve lift systems 120i and 120e are changed from one to the other and when the cams are not changed. Because the driver can see the light emitting modes of the LED units 154 of the indication section 153, the driver can prospectively recognize that the cams of the variable valve lift systems 120i and 120e are changed to one another after the gear shift operation is completed. Consequently, the cam changes by the variable valve lift systems 120i and 120e are made always under expectation. The driver thus can drive the car smoothly all the time.

The cam changes by the variable valve lift system 120i and 120e are made at the predetermined cam change engine speed M. The driver can prospectively recognize the engine speed given after the gear shift operation. Therefore, the driver can always take account of the cam change engine speed M while driving the car. The drive suitable for the driver's preference thus is practicable. As a result, the drivability is enhanced. For example, the driver can change gears at an engine speed M such that the cam changes are not made beyond this particular engine speed M. Accordingly, the drive in a high-speed cam range and the drive in a low-speed cam range both can be readily maintained.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, including more, less or only a single element, are also within the spirit and scope of the invention.

What is claimed is:

1. An indicator for a vehicle having an engine and a transmission, comprising:
   a primary engine speed indicator for indicating a present engine speed; and
   an auxiliary engine speed indicator for indicating a projected engine speed given after a gear shift operation of the transmission and calculated based upon the present engine speed,
   wherein the engine has a variable valve lift system that varies a valve lift amount of a valve thereof by changing between a low speed cam and a high speed cam at a predetermined cam change engine speed, the auxiliary engine speed indicator indicates that the cams will be changed by the variable valve lift system when the gear shift operation is completed, if the engine speed varies beyond the cam change engine speed while the gear shift operation of the transmission is made.

2. The indicator for a vehicle according to claim 1, wherein the auxiliary engine speed indicator indicates the projected engine speed given after a multi-speed gear shift operation of the transmission.

3. The indicator for a vehicle according to claim 1, wherein the auxiliary engine speed indicator is provided around the primary engine speed indicator at equal and discrete intervals.

4. The indicator for a vehicle according to claim 3, wherein the auxiliary engine speed indicator distinguishes the projected engine speed given after the gear shift operation of the transmission from engine speeds other than the projected engine speeds after the gear shift operation with a different color.

5. The indicator for a vehicle according to claim 1, wherein the indicator provides a warning that over revolution of the engine is expected when the gear shift operation of the transmission is completed, if the engine speed given after the gear shift operation of the transmission exceeds a permissible maximum engine speed.

6. The indicator for a vehicle according to claim 5, wherein the auxiliary engine speed indicator warns of over revolution of the engine by using a color that is different from a color for indicating a state in which no over revolution is expected.

7. The indicator for a vehicle according to claim 1, wherein the auxiliary engine speed indicator indicates that the cams are changed by the variable valve lift system in a manner that is different from a manner indicating the engine speed given after the gear shift operation of the transmission.

8. The indicator for a vehicle according to claim 7, wherein the auxiliary engine speed indicator indicates that the cams are changed by the variable valve lift system, by blinking of the indicator.

* * * * *